Figure 1:
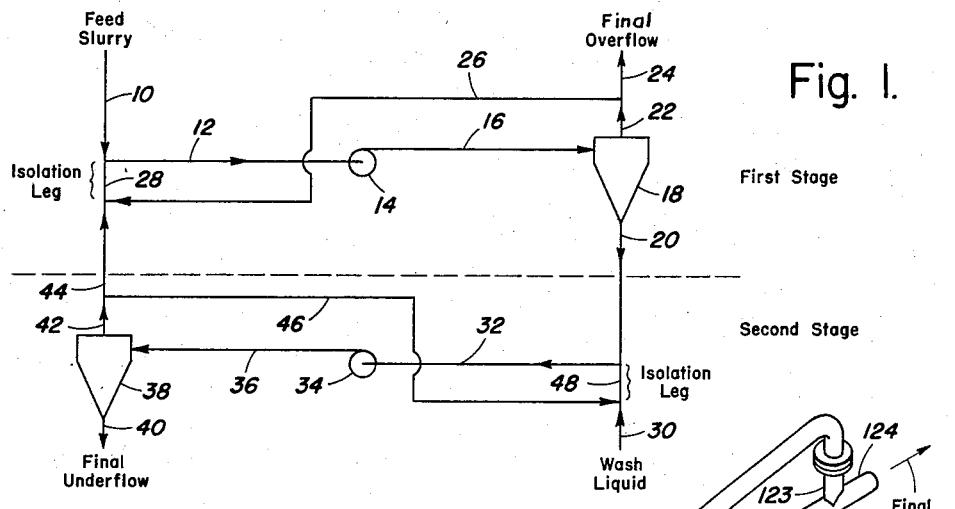

June 24, 1958 P. L. STAVENGER ET AL 2,840,524
HYDROCYCLONE COUNTERCURRENT WASHING SYSTEM
Filed Sept. 23, 1954

INVENTORS
Paul L. Stavenger
Elliot B. Fitch

BY George H. Hopkins
ATTORNEY

United States Patent Office 2,840,524
Patented June 24, 1958

2,840,524

HYDROCYCLONE COUNTERCURRENT WASHING SYSTEM

Paul L. Stavenger and Elliot B. Fitch, Westport, Conn., assignors to Dorr-Oliver Incorporated, a corporation of Delaware Application September 23, 1954, Serial No. 457,916

14 Claims. (Cl. 210—21)

This invention relates to hydrocyclones. More particularly it relates to a self-regulating hydrocyclone apparatus and process especially useful for continuous countercurrent washing systems.

As a separating device, and more particularly as a concentrating or densifying device the hydrocyclone or, as it is sometimes referred to in the art, the liquid cyclone, is well known. It is disclosed for example, in the U. S. Patent No. 2,377,524, to Samson et al., and in U. S. Patent No. 2,654,479 to Driessen.

The hydrocyclone essentially comprises a tangentially fed device adapted to bring about a helical and spiral movement of the mixture or suspension being treated, whereby centrifugal forces of a very high order of magnitude are generated which act to separate the more readily settleable constituents of the feed, generally referred to as "underflow" fraction, from the less-readily settleable constituents, generally referred to as "overflow" fraction. Means are provided for separately and continuously discharging each of the said fractions.

While there are a number of variables which affect the separation achieved by a hydrocyclone, one of the most significant is the quantity of material introduced to the unit, and it is with the elimination or minimization of this variable that this invention is primarily concerned. In some systems, such as countercurrent washing systems, it is necessary or desirable to use a plurailty of hydrocyclones or hydrocyclone stages arranged in series. When this is the case, it is apparent that variations from optimum in the operation of any single unit or stage will tend to produce adverse effects in other units since it will bring about deviations from optimum pressure, and/or feed volume and/or composition in the other units or stages. In an attempt to minimize such eventuality, past practice has been to utilize sumps or other equalizing storage means in conjunction with each stage. This practice has manifest drawbacks however, not least among them being high initial cost, space requirements and, in certain applications, troublesome sanitation problems.

It is the principal object of this invention to provide a multi-stage hydrocyclone system with self-regulation within each stage, while, at the same time, making it possible to have manual or automatic control within each stage, without such regulation and control having a significant deleterious effect on the separation in the other stages in the system. Stated somewhat differently, this invention provides a multi-stage hydrocyclone system wherein each stage is functionally isolated from preceding and succeeding stages while remaining in hydraulic communication therewith.

Essentially, this invention resides in the provision of means whereby the flow of feed material to a stage is volumetrically augmented by diluents in such a manner that the quantitative input to the hydrocyclone remains substantially constant, while at the same time, the passage of all feed material directed to the stage through the hydrocyclone or hydrocyclones of that stage is assured. In the case of countercurrent washing of solids-bearing slurries, for example, it comprises the provision of means whereby the degree of dilution of the feed with auxiliary liquid is rendered inversely proportional to the availability of feed material, while simultaneously avoiding passage of feed material into the auxiliary or wash liquid supply means. From the apparatus point of view, it comprises providing hydraulic communicating means joining one or the other of the discharge means of the stage, and preferably the overflow discharge means to the wash-liquid supply means of the stage in such a manner that the juncture of the hydraulic communicating means with the wash liquid supply means is separated from the juncture of the wash liquid supply means and the feed material supply means by a length of conduit which may, for ease of reference, be termed an "isolation leg." By reason of the presence of the said hydraulic communicating means and of the isolation leg, an order of availability of materials to the suction side of the pumps is established whereby the first material taken is the feed to be treated. If, as would be the case in all but the most unusual circumstances, this material is quantitatively less than the operating capacity of the pump, the difference is made up by wash liquid. If the pump capacity is greater than the availability of material to be treated, but less than the sum of the said material and wash liquid, excess wash liquid will bypass the stage completely by way of the said hydraulic communicating means. But, if the sum of material to be treated plus wash liquid is less than the pump's capacity, the wash liquid to be combined with the material to be treated will be augmented by a recycle of stage discharge whereby the total availability of material to the pumps is held substantially constant. This augmenting of wash liquid with recycled discharge, which, incidentally, is the contemplated normal mode of operation, takes place upstream in the wash liquid means from the juncture of the wash liquid means and the feed means for material to be treated.

It should be noted that the term "washing liquid" as used herein is intended to signify any liquid material which is utilized within the system to extract from a second materail fed to the system, one or more of the constituents thereof, whether by solution, entrainment, molecular transfer or otherwise. Correspondingly "countercurrent washing" and similar phrases are to be read as referring to systems incorporating wash liquid as defined above.

It is to be realized, therefore, that because this invention may be embodied in several forms without departing from the spirit or essential characteristics thereof, the embodiments hereinafter described are therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 2:
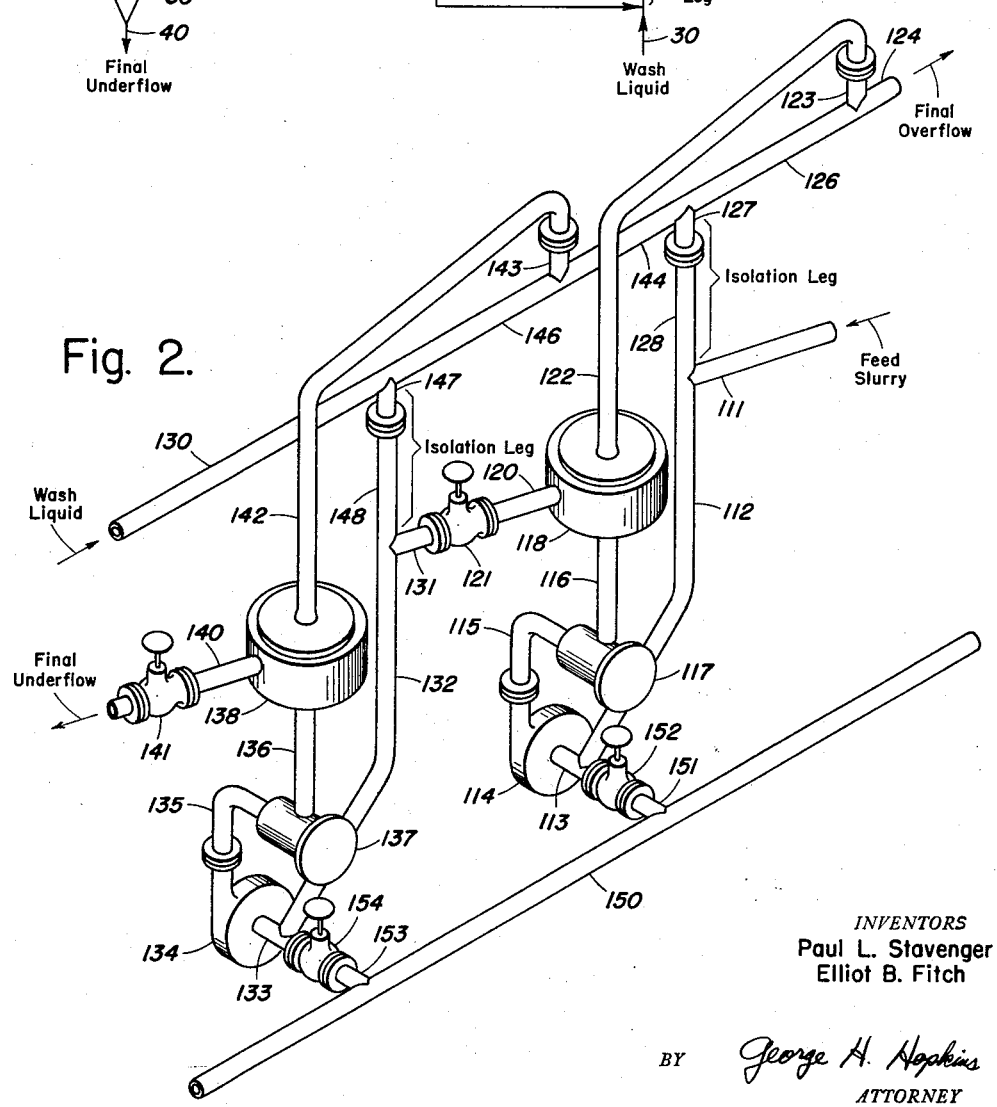

Turning now to the drawings it will be observed that:

Figure 1 is a diagrammatic flowsheet of a two-stage hydrocyclone countercurrent washing system, and Figure 2 is a perspective view of a multiple hydrocyclone two-stage countercurrent washing system which is especially applicable to washing gluten from starch in wet process starch plants.

Referring to Figure 1 in somewhat more detail, in the first stage the feed slurry comprising solids to be washed and impurities to be removed flows through feed slurry conduit 10 into a pump feed conduit 12 from whence it passes to the intake of a centrifugal pump 14. Also introduced into said pump feed conduit is wash liquid from isolation leg or conduit 28, which likewise passes through the pump feed conduit 12 into the intake of the pump 14. Not only does the pump function to impart hydrostatic head, but it also functions to mix the wash liquid with the feed slurry. The mixture under hydrostatic head flows in a continuous stream from the pump through conduit 16 into a hydrocyclone unit 18 where it is separated into an overflow and an underflow, with the underflow passing into underflow collection conduit 20 and the overflow passing into overflow collection conduit 22. Said overflow collection conduit is joined to waste or final overflow conduit 24. Recirculation conduit 26 is also joined to the overflow collection conduit 22 and leads therefrom to an isolation leg 28 whereby the overflow collection conduit 22 is in hydraulic communication with the feed slurry conduit 10 and pump conduit 12. Underflow from the hydrocyclone unit 18 passes through underflow collection conduit 20 from the first stage into the second stage as feed slurry to the second stage.

In the second stage the underflow collection conduit or second stage feed slurry conduit 20 is connected to a second stage pump feed conduit 32. Pump conduit 32 also receives wash liquid which flows through a wash liquid conduit 30 and conduit or isolation leg 48 which is connected to the pump supply conduit 32. Wash liquid from the wash liquid conduit 30 and the underflow discharged from the first stage pass through the pump feed conduit 32 into a centrifugal pump 34 where not only is hydrostatic head imparted, but the wash liquid and first stage underflow are mixed. The mixture under hydrostatic head is then impelled through a conduit 36 into a hydrocyclone unit 38 wherein the mixture is separated into an overflow comprising wash liquid and entrained impurities and, an underflow comprising washed solids.

The underflow obtained in hydrocyclone unit 38 passes through underflow collection conduit 40 as the product or final underflow of the two-stage washing system. The overflow comprising wash liquid and a small amount of impurities passes through overflow collection conduit 42 into first stage wash liquid conduit 44 which leads from the second stage to isolation leg 28 of the first stage whereby second stage overflow passing through this conduit functions as wash liquid for the first stage. Also connected to the outlet of second stage overflow collection conduit 42 is recirculation conduit 46 which leads to the inlet of the second stage isolation leg 48. Thus, provision is made for recirculation within the second stage of a portion of the second stage overflow from hydrocyclone unit 38 to the pump supply conduit 32.

Regardless of whether or not there be a continuous amount of recirculation, when the volume rate of passage of feed slurry through conduit 10 decreases below the required rate therethrough, there will be a recirculation of overflow at substantially the same volume rate as the decrease whereby the volume rate of flow through conduit 12 remains substantially constant.

When the volume rate of flow of feed slurry through conduit 10 increases above the normal operative rate therethrough, or the volume rate of the mixture of first stage wash liquid and feed slurry exceeds the volumetric capacity of the pump 14, under the continuous recirculation condition of operation there will tend to be less recirculation and possibly no recirculation at all in which case it is quite possible as in the case of the discontinuous recirculation condition of operation, that because of the isolation leg 28, less wash liquid will enter into the pump supply conduit 12 and the excess volume of wash liquid will pass through recirculation conduit 26 and out of the stage through the final overflow conduit 24. Thus, the volume rate of flow to conduit 12 tends to remain substantially constant although there may possibly be an increase in the solids concentration of the feed to the hydrocyclone unit 18 whereby the separation of the unit will tend to be coarser, and the solids recovery in the underflow stream passing through conduit 20 will tend to be lowered. This is preferred, however, to a short circuiting of the feed slurry through the stage.

Similarly, in the second stage, when the volume rate of underflow delivery through conduit 20 falls below the normal operative volume rate therethrough, there will tend to be a recirculation of overflow through the recirculation conduit 46 and the isolation leg 48 at substantially the same rate as the decrease in feed slurry rate whereby the volume rate of flow through conduit 32 tends to remain constant.

When the volume rate of first stage underflow delivery to the second stage through the conduit 20 increases above the normal operative rate therethrough, or the volume rate of the mixture of second stage wash liquid and feed slurry exceeds the volumetric capacity of the pump 34, under the continuous recirculation condition of operation there will tend to be less recirculation through the conduit 46 and possibly no recirculation at all in which case it is quite possible as in the case of the discontinuous recirculation condition of operation that, because of the isolation leg 48, less wash liquid will enter into the pump supply conduit 32 and the excess volume of wash liquid will tend to pass through recirculation conduit 46 and out of the stage through the conduit 44. Thus, the volume rate of flow through conduit 32 tends to remain substantially constant.

Hydrocyclone units 18 and 38 may each comprise a single hydrocyclone or they may in each case comprise a plurality of hydrocyclones which can be arranged and adapted by piping to be fed in series such as by passing the overflow of the first hydrocyclone directly to a second, or passing the underflow of the first hydrocyclone directly to another but in any event arranged and adapted with piping to the overflow and underflow collection conduits. The plurality of hydrocyclones may also be arranged and adapted by piping to be fed in parallel as in the case of the so-called multiple hydrocyclone, such as illustrated in Figure 2. In any case, the hydrocyclones are adapted according to what is already known in the art to obtain the optimum degree of solids recovery.

In Figure 2, the hydrocyclone units 118 and 138 are of the multiple hydrocyclone type such as disclosed in U. S. Patent No. 2,671,560 to F. J. Fontein et al. While only a two-stage system has been shown in Figures 1 and 2 it will be realized that other stages and piping therein is within the skill of the art in view of the disclosures herein.

In the two-stage system of Figure 2 feed slurry conduit 111 is connected sideways at right angles to a pump supply conduit 112, by a weld connection. It will be noted that said supply conduit also comprises an upper section or isolation leg 128 through which wash liquid flows. Pump supply conduit 112 is connected at right angles as by a weld connection or the like to pump intake conduit 113 which leads directly to a centrifugal pump 114 wherein mixing of the wash liquid and feed slurry occurs as well as an imparting of hydrostatic head to the mixture. The mixture is impelled from the pump through an exhaust outlet into a pump exhaust conduit 115 which is attached to said outlet as by a flange connection. In the drawings the pump exhaust conduit 115 leads from the pump exhaust outlet into strainer means 117 which function to retain stray particles in the slurry which might block the small inlets and openings of the individual hydrocyclones within hydrocyclone unit 118. From the strainer means, the mixture of feed slurry and wash liquid under hydrostatic head passes into hydrocyclone unit 118 and is separated by means of the individual hydrocyclones therein into an overflow and an underflow. The underflow discharges from the unit by way of an underflow collection conduit 120 which leads to a flow control means 121 that function to regulate the volume rate of discharge of underflow from the unit. The overflow discharges from the unit through overflow collection conduit 122. Overflow collection conduit 122 leads from the hydrocyclone unit 118 through a flange connection to a T-member 123 of the final overflow section 124 of conduit 130. The conduit 130 also has a section 126 between the T-member 123 and a T-member 127 which is attached as by a flange connection to section 128 of conduit 112. The T-member 127 together with conduit section 128 functions as an isolation leg. Thus, provision is made for recirculation of a portion of the overflow from hydrocyclone unit 118 through an isolation leg to the pump supply conduit 112 at least when the feed slurry volume rate in conduit 111 falls below the required volume rate, whereby a substantially constant feed volume rate to the pump is maintained.

In the second stage of the two stage multiple hydrocyclone countercurrent washing system of Figure 2 the underflow discharge from the first stage flows into the second stage feed slurry conduit 131 which is attached to the first stage underflow discharge control valve 121 as by a flange connection, and to a second stage pump supply conduit 132 as by a weld connection. Conduit section 148 of the pump feed supply conduit 132 is attached at one end thereof as by a flange connection to a T-member 147 of wash liquid conduit 130 whereby the T-member and the conduit section form an isolation leg through which wash liquid is passed. Pump supply conduit 132 is connected at right angles as by a weld connection with a pump intake conduit 133. Pump intake conduit 133 leads directly to a second stage centrifugal pump 134 wherein wash liquid and first stage underflow discharge is mixed and hydrostatic head is imparted. The mixture under hydrostatic head passes from the pump through an exhaust outlet into a pump exhaust conduit 135 which is attached to the exhaust outlet as by a flange connection. The exhaust conduit leads to strainer means 137 wherein stray coarse particles are blocked from entering with the mixture into hydrocyclone unit feed supply conduit 136 which leads from the strainer means 137 into the second stage hydrocyclone unit 138. The feed mixture flows into hydrocyclone unit 138 and is separated therein by means of individual hydrocyclones therein into an overflow and an underflow. The underflow is discharged from the hydrocyclone unit 138 by way of an underflow collection conduit 140 which is connected as by a flange connection to flow control means 141 which functions to control the rate of discharge of underflow from the hydrocyclone unit 138. The underflow flowing through the flow control means 141 is here considered as the desired product, the final underflow of washed solids. Overflow produced in hydrocyclone unit 138 is discharged therefrom by way of overflow collection conduit 142 which leads from the hydrocyclone unit through a flange connection to a T-member 143 of wash liquid conduit 130. It will be observed that the T-member 143 of conduit 130 is located on the downstream side of the T-member 147 through which wash liquid is supplied to the second stage pump supply conduit 132. The conduit section 148 and T-member 147, both functioning together as an isolation leg permits recirculation of second stage overflow through recirculation section 146 of conduit 130 to the pump feed supply conduit 132, at least when the slurry volume rate through conduit section 131 falls below the volume rate required.

It will be observed that the final overflow section 124 is actually a part of wash liquid conduit 130. Consequently, there is always a positive hydraulic head in the direction of final overflow discharge when fresh wash liquid is introduced into the system. Furthermore, it will be observed that the overflow from the second stage not only may be recirculated through that stage but also may pass by way of the conduit section 144 from the second stage through the isolation leg formed by T-member 127 and conduit section 128 of the first stage to function as wash liquid for the first stage.

Also shown in the drawing is a conduit 150 having two sidewise extending T-members 151 and 153 each of which are attached as by flange connections, respectively to flow shut-off means 152 and 154. One shut-off means 152 is attached to the pump intake conduit 113 whereas the shut-off means 154 is attached to the pump intake conduit 133. The purpose of conduit 150 and the valves 152 and 154 is to permit flushing liquid to be introduced into the system during periods of shut-down. Another purpose is to permit draining of the system during periods of shut-down. Normally, however, shut-off means 152 and 154 are closed so that there is no passage of liquid or solids from the pump suction conduits 113 and 133 into conduit 150 or vice versa.

The practical embodiment shown in Figure 2 has another unique feature in that each one of the wash liquid conduit sections 126 and 146 also function as an isolation leg to prevent mixing of the wash liquid entering each stage with the overflow leaving each stage except when the volumetric capacity of the pump in each stage is exceeded. Thus, in each stage of Figure 2, there are two isolation legs, to wit: In the first stage, the isolation leg is formed by the conduit section 128 in combination with the T-member 127 and the isolation leg formed by the conduit section 126, and in the second stage, the isolation leg formed by the conduit section 148 in combination with the T-member 147, and the isolation leg formed by conduit section 146.

In Figure 2, when the volumetric capacity of the pump in a stage is exceeded, the pump requirements are preferentially or selectively satisfied, because of the presence of the two isolation legs in the stage, first by the feed slurry, then by the wash liquid, and finally by recirculated overflow, which means that as the excess in volumetric capacity in each pump increases, first, recirculation of overflow stops, then, wash liquid by-passes the stage, and finally, feed slurry will short circuit to wash liquid conduit 130. This final step is very unlikely to occur, however, in well-designed systems.

In both Figures 1 and 2, the respective isolation legs, either in the form of conduits or conduit sections have a length at least equal to four effective pipe diameters. Where the conduit is round in cross section the effective pipe diameter is the diameter of the conduit. Where the conduit is not round in cross section then the effective pipe diameter is found by determining the cross sectional area of the conduit and then determining what diameter would give that area.

A typical use of this invention is in the countercurrent washing of starch to remove gluten therefrom. A countercurrent washing system which will perform this use is shown by the practical embodiment in Figure 2. Typical dimensions suggested for constructing the practical embodiment are set forth as follows:

(1) *Hydrocyclone units 118 and 138.*—Each unit is a hydrocyclone battery comprising 80 operative hydrocyclones, each being of the 10 mm., molded plastic type, adapted to function at 40 p. s. i.

(2) *Pumps 114 and 134.*—Each of the pumps may be adapted to have an operative speed of 1750 R. P. M. These pumps should be actuated by 5 H. P. motors.

(3) *Strainers 117 and 137.*—Each of the strainers may be of the type having a 316 stainless steel basket with 1/16" openings.

(4) *Piping.*—All pipes are of the 2" nominal size except those pipes making up conduits 120, 121, 131 and 140 which are of the 1½" nominal size.

(5) *Valves.*—Can be standard gate valves.

For the sake of simplicity in illustrating the flow characteristics of the practical embodiment constructed as above, reference shall be made to the diagrammatic drawing, Figure 1. Table 1 set forth hereinafter illustrates the results contemplated with the feed volume rate to the first stage at the required feed volume rate for that stage. The figures set forth in Table 2 illustrates the results contemplated when the feed volume rate to the first stage is not at the required feed rate for that stage. In each case the feed pressures are at 40 p. s. i.

*Table I*

| Conduit Reference | Conduit Numeral | Volume Rate (G.P.M.) | Spec. Grav. (°Bé.) | Solids Concen. (lbs. Starch/min.) |
|---|---|---|---|---|
| First Stage: | | | | |
| Feed Slurry | 10 | 34 | 17.5 | 103 |
| Recirculation | 26 | 0 | | |
| Wash Liquid | 44 | 36 | | 15 |
| Hydrocyclone 18 Supply | 16 | 70 | 10 | 118 |
| Overflow | 22 | 42 | | 18 |
| Underflow | 20 | 28 | 20 | 100 |
| Second Stage: | | | | |
| Feed Slurry | 20 | 28 | 20 | 100 |
| Recirculation | 46 | 0 | | |
| Wash Liquid | 30 | 32 | | |
| Hydrocyclone 38 Supply | 36 | 60 | 10 | 100 |
| Overflow | 42 | 36 | | 15 |
| Underflow | 40 | 24 | 20 | 85 |

*Table II*

| Conduit Reference | Conduit Numeral | Volume Rate (G.P.M.) | Spec. Grav. (°Bé.) | Solids Concen. (lbs. Starch/min.) |
|---|---|---|---|---|
| First Stage: | | | | |
| Feed Slurry | 10 | 30 | 17.5 | 90.25 |
| Recirculation | 26 | 4 | | 1 |
| Wash Liquid | 44 | 36 | | 8.75 |
| Hydrocyclone 18 Supply | 16 | 70 | 8.5 | 100 |
| Overflow | 22 | 43 | | 10.25 |
| Underflow | 20 | 27 | | 89.75 |
| Second Stage: | | | | |
| Feed Slurry | 20 | 27 | | 89.75 |
| Recirculation | 46 | 1 | | 0.25 |
| Wash Liquid | 30 | 32 | | |
| Hydrocyclone 38 Supply | 36 | 60 | 8.5 | 90 |
| Overflow | 42 | 37 | | 9 |
| Underflow | 40 | 23 | 20 | 81 |

In Table I the hydrocyclone units 18 and 38 are making an 85% solids recovery. In Table II, the same hydrocyclone units 18 and 38 are making substantially a 90% solids recovery. Thus, with a small amount of recirculation accompanying a decrease in the feed volume rate to the first stage the recovery of each unit will increase whereby no adverse effect on solids recovery results from flocculation in feed volume rates.

This invention, as can be seen from the foregoing can be applied to many different types of hydrocyclone separation processes, and it is noteworthy that it is not only applicable to liquid-solid separations but also may be applied to liquid-liquid separations.

We claim:

1. A separation system comprising at least one hydrocyclone stage having a pump, a hydrocyclone unit with feed inlet means and at least two discharge conduits leading therefrom, a conduit leading from the exhaust of said pump to the feed inlet means of said hydrocyclone unit, conduit means for delivering a liquid-borne feed material to be separated to the intake of said pump, conduit means for supplying wash liquid to the stage, said wash liquid conduit means being in hydraulic communication with one of said discharge conduits, and an isolation leg conduit from the wash liquid conduit to the intake of said pump for passing wash liquid and recirculating hydrocyclone unit discharge to the intake of said pump, whereby the volume rate of flow from the pump is maintained substantially constant.

2. A separation system according to claim 1 wherein said wash liquid conduit means is in hydraulic communication with one of said discharge conduits by way of a recirculation conduit functionable as an isolation leg.

3. A separation system according to claim 1 wherein said discharge conduit in hydraulic communication with said wash liquid conduit is the hydrocyclone unit overflow discharge conduit.

4. A process for the continuous countercurrent washing of impurities from solids, which comprises the combination of steps of flowing as a feed at a predetermined average operative volume rate a slurry of solids to be washed in a confined feed stream to a pumping step; flowing as a feed at a predetermined, average operative volume rate a wash liquid in a confined feed stream to said pumping step; in said pumping step mixing said slurry with the wash liquid and imparting hydrostatic head to the mixture of slurry and wash liquid; passing the mixture under hydrostatic head at a predetermined volume rate in a confined stream into a confined, free whirling liquid vortex; hydraulically separating in said vortex said mixture into an overflow fraction comprising a major portion of the wash liquid and impurities and an underflow fraction comprising a major portion of the washed solids; hydraulically discharging said fractions from said vortex in separate and confined streams; recirculating a portion of one of said discharged fractions through a part of a feed stream to said pumping step at least whenever the volume rate of flow of said feed slurry decreases, and at a volume rate substantially equal to the decrease in volume rate of said feed slurry whereby the volume rate of mixture passing from said pumping step is maintained substantially constant at said predetermined volume rate, said part of the feed stream in which both recirculated fraction and wash liquid feed pass being an isolation leg, and said feed stream through which said portion of discharged fraction recirculates being the wash liquid stream.

5. A process according to claim 4 wherein the discharged fraction, a portion of which is recirculated, is the overflow fraction.

6. A separation system comprising a plurality of hydrocyclone stages, each stage comprising pump means and at least one hydrocyclone having feed inlet means and underflow and overflow discharge means, conduit means for transmitting pump discharge to the feed inlet means, conduit means for delivering a liquid-borne feed material to the intake of said pump means, conduit means leading from the overflow discharge means to a wash liquid header common to the plurality of stages, a conduit comprising an isolation leg leading from said common header to a juncture with the liquid-borne feed material conduit means for each stage, and conduit means leading from said hydrocyclone underflow discharge means, in all but the last stage of said plurality of stages, to discharge into said liquid-borne feed material conduit of the next succeeding stage.

7. A separation system according to claim 6 wherein said wash liquid header is adapted to receive wash liquid from a source upstream, as to the direction of flow of wash liquid in said header from said source, of said last stage of said plurality of stages.

8. A separation system according to claim 6 wherein the juncture of the conduit means for discharge from each stage with the wash liquid header is disposed downstream as to the general direction of flow in said header from the isolation leg of the said stage.

9. A separation system according to claim 6 wherein strainer means are provided in the said conduit means for transmitting pump discharge to the feed inlet means of each hydrocyclone stage.

10. A separation system according to claim 6 wherein additional conduit means are provided in the lowermost portion of each stage for the dual purpose of flushing the system when necessary and draining the system during periods of shut-down.

11. A process according to claim 4 wherein said underflow fraction is conveyed to a separate said combination of steps to comprise the slurry feed thereof.

12. A process according to claim 4 wherein that portion of said overflow which is not recycled is conveyed to a separate said combination of steps to comprise a portion of the wash liquid thereof.

13. A process for the continuous countercurrent washing of at least one constituent from a liquid-borne material containing such constituent which comprises the combination of steps of flowing said liquid-borne material, as a confined feed stream, and at predetermined average operative volume rate, to a pumping step; flowing washing liquid in a confined feed stream and at a predetermined average operative volume rate to said pumping step; in said pumping step, mixing said liquid-borne material with said wash liquid and imparting hydrostatic head to the mixture; passing the mixture under hydrostatic head at a predetermined volume rate in a confined stream into a confined, free-whirling liquid vortex; hydraulically separating said mixture in said vortex into an overflow fraction and an underflow fraction; hydraulically discharging said fractions from said vortex in separate and confined streams; recirculating a portion of one of said discharged fractions through a part of a feed stream to said pumping step; said part of a feed stream in which both recirculated fraction and wash liquid feed pass being an isolation leg, and said feed stream through which said portion of discharge fraction circulates being the wash liquid stream.

14. A process according to claim 13, wherein the discharged fraction, a portion of which is recirculated, is the overflow fraction.

References Cited in the file of this patent
UNITED STATES PATENTS 2,377,524     Samson  ---------------- June 5, 1945